V. L. GARCIA.
AUTOMATIC VALVE CLOSURE FOR WATER COCKS OR FAUCETS.
APPLICATION FILED JAN. 11, 1909.

997,124.

Patented July 4, 1911.

WITNESSES
W. M. Avery
J. P. Davis

INVENTOR
Virgilio Lopez Garcia
BY
Munn & Co
ATTORNEYS

COLUMBIA PLANOGRAPH CO., WASHINGTON, D. C.

UNITED STATES PATENT OFFICE.

VIRGILIO LOPEZ GARCIA, OF BUENOS AIRES, ARGENTINA.

AUTOMATIC VALVE-CLOSURE FOR WATER COCKS OR FAUCETS.

997,124.  Specification of Letters Patent.  Patented July 4, 1911.

Application filed January 11, 1909. Serial No. 471,576.

*To all whom it may concern:*

Be it known that I, VIRGILIO LOPEZ GARCIA, a citizen of Argentina, residing at Buenos Aires, Argentina, have invented a new and useful Automatic Valve-Closure for Water Cocks or Faucets, of which the following is a specification.

The present invention relates to an automatic valve closure for water cocks or faucets, adapted to be acted upon by the pressure of the water itself.

Figure 1:
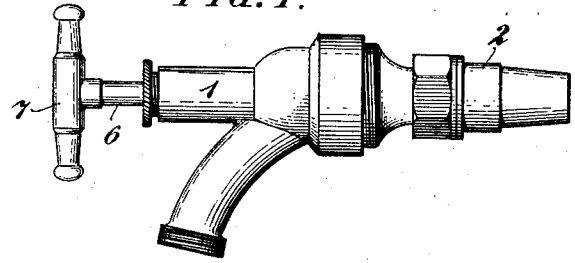
Figure 2:
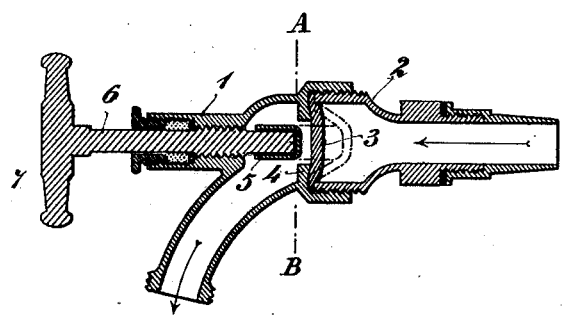
Figure 3:
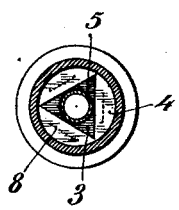

Figure 1 is a side elevation of a faucet or cock for water piping. Fig. 2 is a sectional central vertical elevation of the same. Fig. 3 is a section on the line A—B of Fig. 2, and Fig. 4 is a plan view of the rubber disk which forms the valve.

The body of the faucet consists of the parts 1 and 2 screwed together and between the said parts is the pure rubber disk 3 having incisions therein. The disk 3 serves both as a valve and a means for making a tight joint between the parts of the body. The part 1 of the body is provided with a wall 4, having an orifice therein, said orifice being made in the shape of an equilateral triangle, as best shown in Fig. 3.

The part 1 of the body is provided with a spout and in said part is mounted a screw 6 having a short tube or sleeve 5 loosely mounted on its inner end and provided at its outer end with a handle 7. When the screw 6 is turned in one direction, the tube or sleeve 5 on the end of the screw enters the triangular orifice and expands the disk, as shown in dotted lines in Fig. 2, thereby leaving three openings for the passage of the water. Upon turning the screw in the opposite direction, the disk by its elasticity and the pressure of the water returns to its normal position and closes the orifice.

Figure 4:
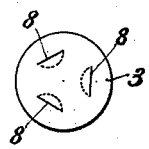

In Fig. 4 the rubber disk 3 is shown provided with notches or incisions 8 which pass through the entire thickness of the rubber and are placed so that, when the rubber disk 3 is on the valve opening, said notches or incisions will be against the wall 4 and parallel to the sides of the triangular opening, as shown by the dotted lines in Fig. 3.

It will be readily understood that, when the cylindrical tube 5 is moved by the screw 6 against the rubber disk 3 fixed at its circumference, the incisions or cuts 8 will be obliged to open themselves by the expansion or stretching of the rubber, thus producing the openings shown in dotted lines in Fig. 4, which openings will reach their maximum size when the screw has effected its maximum stroke. The water escapes through these openings in the rubber, issuing through the free corners of the triangle.

By releasing the screw, the rubber disk returns to its natural position by its own elasticity and by the pressure of the water which presses against the brass wall 4, thus forming a double closure, absolute and exact even in case of very low pressure in the water mains, since in that case the closure of the cuts or incisions 8, which take place by the simple contraction of the rubber, will suffice. The tendency which the cuts of the disks have to become elongated by the expansion of the disk, is counteracted owing to the extremities of the disk being clamped between the parts of the body of the faucet.

It is known that pure rubber keeps its elastical qualities without alteration within the water, as it is the oxidizing effect of dry air which deteriorates and destroys the rubber.

What I claim is:

1. A cock or faucet having an opening, a rubber disk having an incision therein and arranged over said opening, and means for expanding the rubber disk.

2. A cock or faucet having a triangular opening, a rubber disk arranged over said opening and provided with incisions, and means for expanding said disk.

3. A cock or faucet having a triangular opening, a rubber disk arranged over said opening and provided with incisions adjacent to its periphery and parallel with the walls of said opening, and means for expanding said disk.

4. A cock or faucet, comprising a body formed of two parts secured together, one part having a triangular opening, a rubber disk having incisions therein and secured between the said parts over the opening, and a screw rod mounted in one part and adapted to enter the opening thereof and engage the rubber disk to expand the same.

5. A cock or faucet, comprising a body formed of two parts screwed together, one part having a spout and a triangular opening, a rubber disk having incisions therein and secured between the said parts over the said opening, and a screw rod mounted in the part of the body provided with the spout and adapted to enter the said opening and engage the rubber disk to expand the same, the inner end of the screw rod having a sleeve loosely mounted thereon.

In witness whereof I have signed this specification in the presence of two witnesses.

VIRGILIO LOPEZ GARCIA.

Witnesses:
ANTONIO L. BELLA,
OTTO JOHANNES TCHIBOLD.

Copies of this patent may be obtained for five cents each, by addressing the "Commissioner of Patents, Washington, D. C."